United States Patent [19]

Snellman

[11] E Re. 30,031

[45] Reissued Jun. 12, 1979

[54] SHEET STACK JOGGING MECHANISM

[75] Inventor: Donald L. Snellman, Seattle, Wash.

[73] Assignee: Norfin, Inc., Seattle, Wash.

[21] Appl. No.: 647,729

[22] Filed: Jan. 9, 1976

Related U.S. Patent Documents

Reissue of:

[64] Patent No.: 3,658,324
Issued: Apr. 25, 1972
Appl. No.: 34,368
Filed: May 4, 1970

[51] Int. Cl.[2] ..... B65H 31/38; B65H 31/24

[52] U.S. Cl. ..... 271/222; 271/173

[58] Field of Search ..... 271/221, 222, 173, 64

[56] References Cited

U.S. PATENT DOCUMENTS

| | | | |
|---|---|---|---|
| 487,152 | 11/1892 | Onderdonk | 271/222 |
| 584,633 | 6/1897 | Gottlieb | 271/221 |
| 1,494,339 | 5/1924 | Clauberg | 271/222 |
| 1,865,308 | 6/1932 | Evans et al. | 271/221 |
| 1,891,286 | 12/1932 | Miersch | 271/222 X |
| 3,032,340 | 5/1962 | Lawrence | 271/222 |
| 3,172,656 | 3/1965 | Mestre | 271/222 X |
| 3,356,362 | 12/1967 | Mestre | 271/64 X |
| 3,388,907 | 6/1968 | Snellman et al. | 271/222 |
| 3,627,312 | 12/1971 | Fackler et al. | 271/221 |

FOREIGN PATENT DOCUMENTS

| | | | |
|---|---|---|---|
| 305404 | 11/1930 | Canada | 271/221 |
| 524503 | 5/1956 | Canada | 271/221 |
| 636114 | 2/1962 | Canada | 271/221 |
| 661828 | 4/1963 | Canada | 271/221 |
| 565353 | 11/1944 | United Kingdom | 271/221 |
| 629105 | 9/1949 | United Kingdom | 271/221 |
| 732322 | 6/1955 | United Kingdom | 271/210 |
| 749460 | 5/1956 | United Kingdom | 271/221 |
| 768514 | 2/1957 | United Kingdom | 271/221 |
| 925784 | 5/1963 | United Kingdom | 271/221 |
| 1025618 | 4/1966 | United Kingdom | 271/221 |

*Primary Examiner*—Bruce H. Stoner, Jr.
*Attorney, Agent, or Firm*—Dowrey & Cross

[57] ABSTRACT

A device for jogging or laterally tapping a loosely formed stack of sheets in order to form neat piles in receiving bins having a plurality of vertical rows of shelves. A jogging rod periodically is activated to move the stack of sheets located upon the shelves against a uniform backing device assuring a vertical stack, the jogging rod is movable to a position allowing access to the shelves from the side having the jogging mechanism.

20 Claims, 6 Drawing Figures

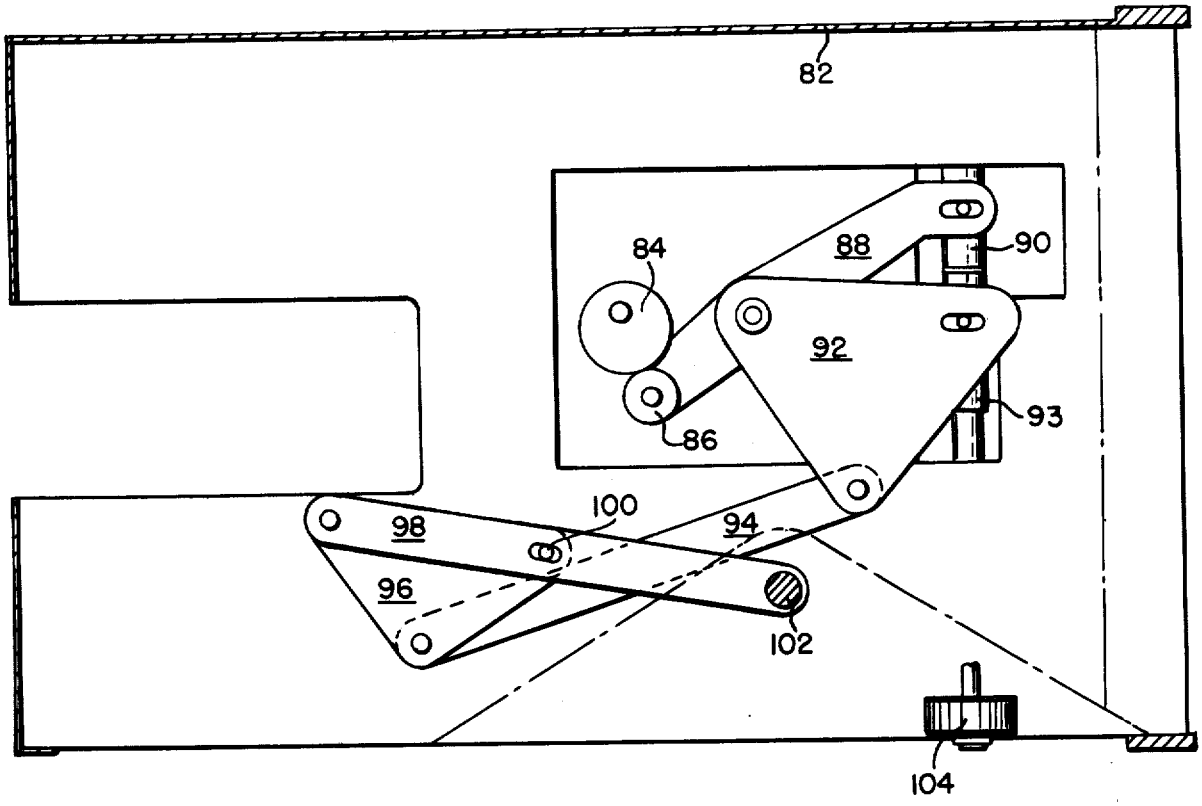
FIG—4
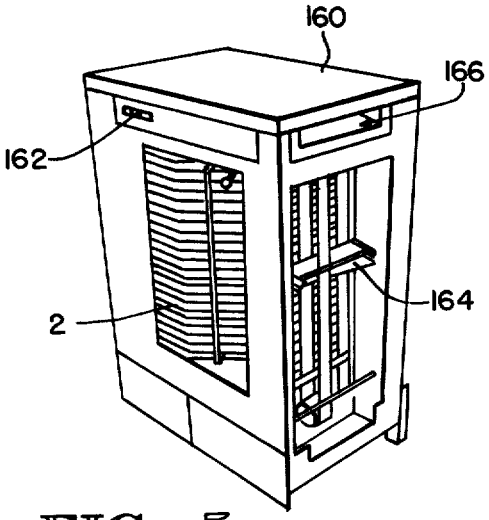
FIG—5
FIG—6
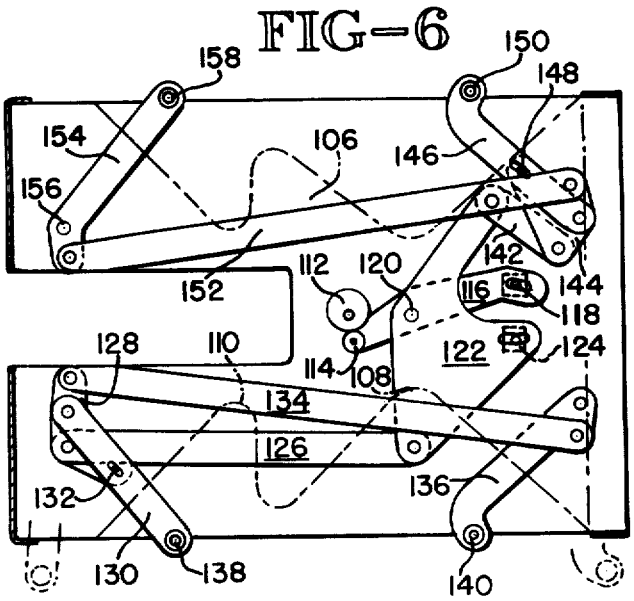

SHEET STACK JOGGING MECHANISM

Matter enclosed in heavy brackets [ ] appears in the original patent but forms no part of this reissue specification; matter printed in italics indicates the additions made by reissue.

BACKGROUND OF THE INVENTION

The present invention relates to sheet stack formers and more particularly to a device for jogging or laterally tapping a loosely formed stack of sheets in order to form a neat pile. More particularly, the invention relates to a jogging mechanism for simultaneously jogging a plurality of individual stacks in a vertical [row.] *column.*

The present invention has particular utility in a device such as a collating system or the like wherein a plurality of stacks of sheets are rapidly formed. In such instances, receiver bins are used which employ one or a plurality of vertical [rows] *columns* of shelves which are successively aligned with a collator distributor. The distributor delivers a predetermined number of sheets to each one of a preselected number of vertically arranged receiver trays or compartments. Because of the rapid feeding, which is accomplished automatically, the stack of sheets [and] *in the* individual trays are often extremely uneven.

The present invention provides a jogger or sheet guide for receiving bin shelves of the character described. The invention provides a sufficiently wide reception area for the rapidly deposited sheets and, after loose stacks are formed, laterally taps or jogs the stacks to even up the piles which may then be removed from the receiver. The jogging or lateral tapping means is so designed that it may be rapidly and easily moved out of the position in front of the shelves allowing access to the piles of paper from the same side of the shelves which contains the jogging means.

The jogging may be done simultaneously with and may be a function of the movement of the distributor means which carries the sheets to the various preselected vertically arranged trays or alternatively may be periodically actuated by any other preselected means.

In the prior art it has been the practice to provide either fixed shelf walls or laterally adjustable side walls for the reception of different sizes of sheets where receiver trays have been used. With the present invention, the jogging rods which form the lateral guides for the incoming sheets not only function to tap the pile of sheets to obtain a neat stack but are also initially adjustable for varying widths of paper and take the place of the side walls.

It is an object of the present invention to provide a jogging apparatus for use with a vertical [stack] *column* of sheet receiving trays whereby the jogging means may be easily moved allowing access to the shelves.

In accordance with this object and as a feature of the present invention, there is provided in combination with a sheet receiving shelf, a jogger which will periodically tap the edges of a plurality of sheets stacked upon the shelf, the jogger is pivoted about a point whereby it can be moved to a position where it is not impeding access to the shelf.

Another object of the present invention is to provide a sheet jogging means for use [upon] *in* a sheet receiving [shelf] *bin having a vertical column of shelves* wherein the jogging means is adapted to tap sheets from either side or from both sides and to allow full access to the shelves likewise from either side, greatly increasing the versatility of the apparatus.

In accordance with this object and as a feature of the present invention, there is provided a jogging means adapted for use in combination with a [shelf] *bin having a vertical column of shelves,* the jogging means being located and actuated simultaneously on both sides of the [shelf] *bin.* At any time either of the jogging apparatuses may be moved to a position not impeding access to the [shelf] *shelves* allowing removal of the stacks from that side of the [shelf] *shelves.*

The means by which the foregoing objects and other advantages, which will be apparent to those skilled in the art, are accomplished is set forth in the following specification and claims and illustrated in the drawings.

BRIEF DESCRIPTION OF THE DRAWINGS

FIG. 4 is a plan view of a jogging apparatus wherein a single jogger is incorporated;

FIG. 5 is a perspective environmental view showing the sheet receiving [shelf] *bin* and attached jogger in the position in a cabinet including a collator distributor means; and FIG. 6 is a plan view of a jogger mechanism having four jogging members.

DETAILED DESCRIPTION OF THE DRAWINGS

Figure 1:
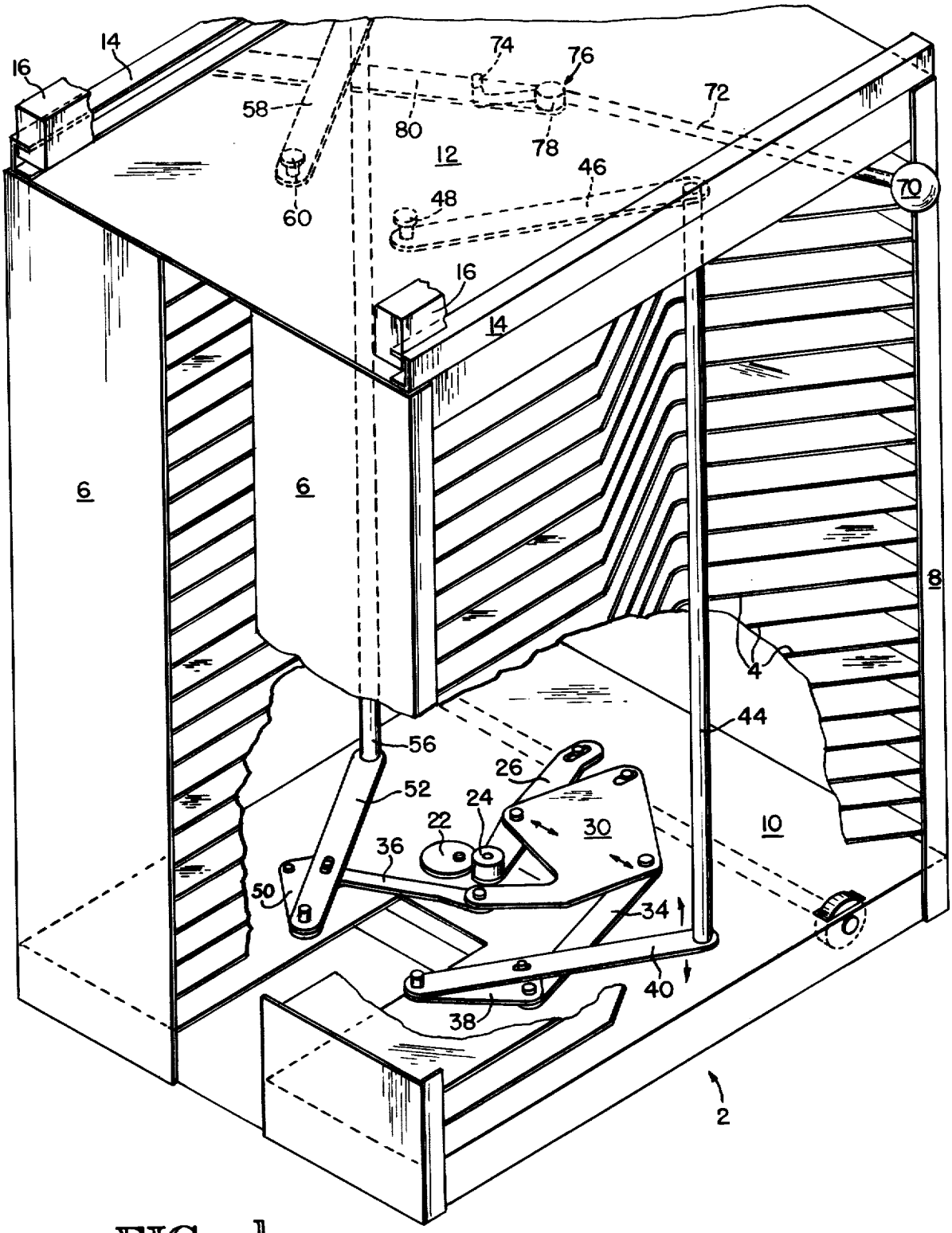
FIG. 1 is a perspective view, partially broken away, of the jogging mechanism in combination with a sheet receiving [shelf] *bin;*

As seen in FIG. 1, the sheet receiving bin denoted generally as 2 has mounted therein a plurality of evenly spaced trays or shelves 4 mounted within a framework having a vertical end 6 with spaced sections and frame members 8. The frame members 8 and the end 6 provide vertical support for the shelves or bins 4. Completing the enclosure is a floor member 10 providing support for the jogging apparatus and a top member 12 having mounted thereupon U-shaped rails 14 for cooperation with a track 16 having a slot to receive one leg of the U, said track being mounted within a cabinet structure such as shown in FIG. 5. The track 16 and rail 14 may be mounted by any means known in the art, such mounting deemed to be not critical in the present invention so therefore not shown or particularly described.

Figure 2:
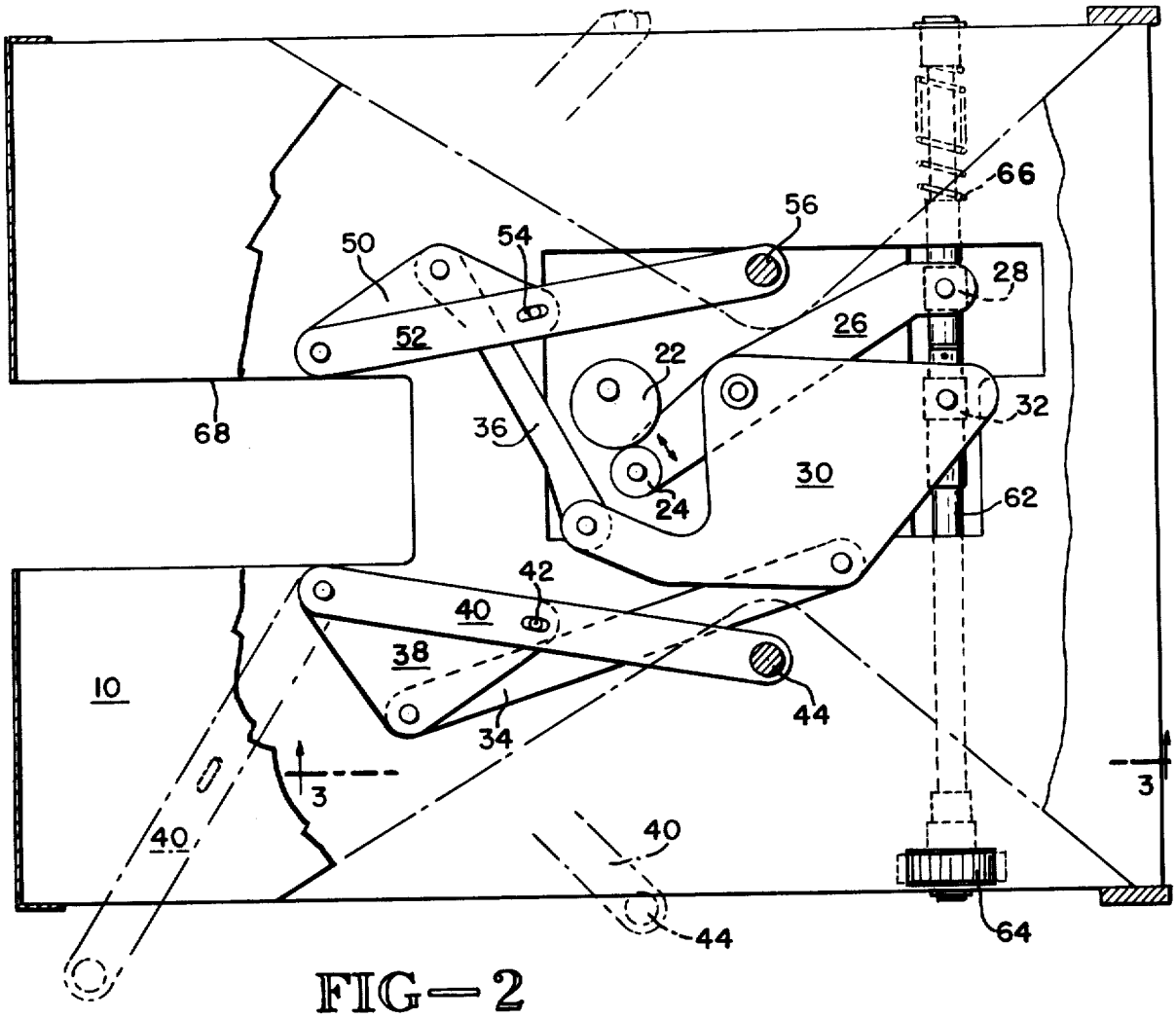
FIG. 2 is a plan view of the jogging apparatus of FIG. 1.
Figure 3:
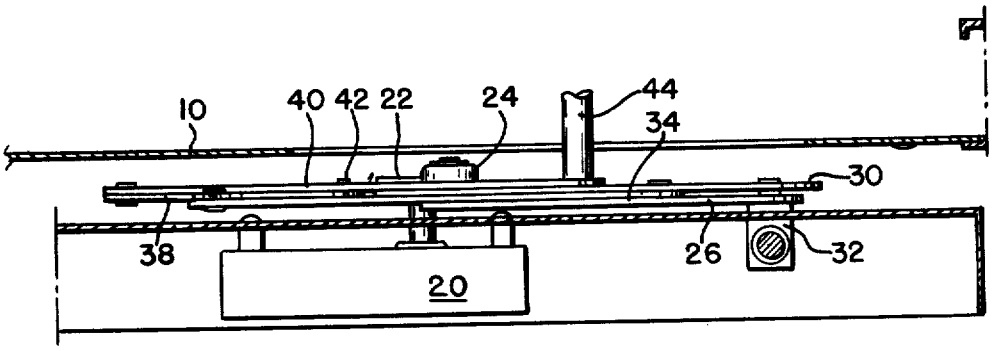
FIG. 3 is an elevational view along lines 3—3 of FIG. 2.

Mounted to the bottom side of the floor 10 is the actuating device for the jogger. Reference being had to FIGS. 1, 2 and 3 in combination, a complete structure may be most readily understood. In the preferred embodiment, the jogging action is the result of a rotary motion developed by motor 20 having normal electrical connections which drives an eccentric cam 22 imparting a reciprocal motion to the cam follower 24. Cam follower 24 is mounted upon an elongated flat arm 26 which is pivotally mounted at its opposite end serving as a second class lever to an adjustable block member 28, later hereinafter described. Pivotally mounted to the central portion of arm 26 is an irregularly shaped flat lever arm 30 having four pivotal connection points. Lever arm 30 is likewise mounted to a block 32 hereinafter later described and at yet another corner has pivotally mounted thereto a bar 34. Lever arm 30 also has a tail portion designed to clear the cam follower 24 and has pivotally mounted thereto yet another flat bar or link 36. Pivotally mounted to the opposite end of bar or link 34 is a flat triangular shaped linking member 38 which has the pivotal connection to bar 34 at one of its vertices and a pivotal connection to a support bar for the jogger 40 at another of its vertices. A locking element 42 at the third vertex of link 38 is designed to hold the support bar 40 in position along the side of the triangle. The support bar 40 extends outwardly from the triangular member 38 normally locked with the locking element 42 in a position along the side of member 38 and terminates in an upwardly extending rod 44 which, as seen in FIG. 1, extends the entire vertical dimension of the shelf [structure] *column* to terminate in another link 46 which is pivotally connected to the top of the cabinet at point 48.

It is to be noted at this point that the locking mechanism 42 comprises a pin extending vertically upwardly from the triangular shaped member 38. The upper link 46 is attached to the top at 12 at point 48 in such a manner as to allow vertical movement of the link. To unlock the rod 44 and move it out of its normal position extending in front of the plurality of [bins,] *shelves,* the operator must provide a vertical movement to the rod 44 and its attached links lifting it above the top of the pin portion of locking mechanism 42 and then swing it outwardly to a position as shown in phantom leftwardmost in FIG. 2.

Referring again specifically to FIG. 2, there is shown in phantom lines at the outermost extreme position which will be taken by the jogger mechanism when in normal process. In operation with the motor running, the jogger bar 44 would periodically move from the phantom position as shown to the solid position as shown, bumping the sheets of paper into a vertically aligned stack.

Referring now to the other flat link or lever 36 connected to the tail portion of the irregularly shaped member 30, it can be seen that it is connected to a mechanism similar to that hereinabove described. The outer end of link 36 is pivotally connected to a triangularly shaped link 50 at one of its vertices. At another vertex of the triangle there is pivotally connected a flat bar or link 52 which extends along the side of the triangle to be locked to the triangle 50 at point 54 similarly as hereinabove described with respect to triangle 38 and link 40. The bar 52 then extends further outwardly of the triangle 50 to terminate at a connection with a rod 56 which extends vertically upwardly to a lever 58 and a pin 60 similar to that previously described with respect to jogging rod 44.

Referring now specifically to FIG. 2, it can be seen at the right hand side of the Figure there is a rod 62 mounted for rotation between the two side walls at the base of the [shelf] *bin* structure. Located at one end of the rod but not limited thereto is a handle 64, it being understood that the handle could be at either end or perhaps at both ends. Mounted to the rod 62 at a portion of the rod having threads formed thereon is block 32 having complementary threads formed therein. Thus it can be seen that a rotary motion of rod 62 will effect a linear movement of block 32 along the [rid] *rod.* The movement of block 32 will [be] *by* means of the linkage described above, adjust the spatial relationship of the jogging rods 44 and 56. As a safety factor, block 28 is slidably mounted upon rod 62 and abuts compression spring 66. If the mechanism becomes jammed, link 26 will pivot about its point of attachment to 30 transmitting the motion imparted by eccentric 22 to the spring 66 without damage to the structure. Spring 66 must be of sufficient stiffness to serve as the base for the fulcrum of link 26 during normal usage.

As plainly seen in FIG. 1, the rods 44 and 56 are located upon opposite sides of the bin, bridging the openings between the shelves. The shelves have a configuration whereby they do not interfere with the movement of the rods toward and away from each other. Sufficient clearance is provided to accommodate the spatial adjustment between the rods enabling the structure to accommodate sheets of a variety of sizes. The structure, as described, thusly will perform its function regardless of how many shelves are actually being used in the given collating operation.

The rectangular shaped opening to the left of the shelf structure as seen in FIG. 2 and denoted generally as 68, is to accommodate a back part which will extend the full vertical distance of the shelf structure and will be in a preferred embodiment a resilient rubber member which is pivotally secured at both the top and the bottom without any intermediate suspension. This mounting means allows a harmonic motion to be set up within the rubber member as the sheets are fed along the various trays and bump against the rubber member. The rubber member is not shown, not being considered essential to the present invention; however, it is the means by which the preferred embodiment accomplishes the jogging in the other dimension which assures smooth even stacking of the sheets. The sheets are fed from the front of the shelving, slide along the smooth surface and then bump against the rubber member which as noted above is set into a harmonic motion providing a continual jog to the sheets as they are placed in position.

As was noted above, the shelf structure shown in FIG. 1 is adapted to be mounted in a cabinet structure such as shown in FIG. 5. The cabinet structure would include as a part thereof a distributor means. To accommodate sheets of various sizes and perhaps even different models of the distributor means, an adjustment of the shelf structure forwardly and backwardly within the cabinet is necessary. This adjustment is accomplished by means of the handle 70 located at the top part of the shelf structure of FIG. 1 which is attached to a rod 72 pivotally connected to the top of the cabinet at 74. The rod 72 has a bend at 76 to interact with a circular end portion 78 on a spring biased lever 80 such that the spring bias lever 80 and the rod 72 with its incorporated bend 76 operate as an overcenter link locking the shelf in position during the collating operation.

Referring now to FIG. 4, it can be seen that the inventive structure is readily adapted to a single jogger wherein the sheets are jogged against a back panel 82 instead of against another jogging rod as hereinabove described. Basically, the structure is identical, having an eccentric cam 84 mounted to a motor located beneath the floor of the shelf structure. A cam follower 86 interacts with cam 84 and is connected to a bar 88 pivotally connected to the adjustable block 90 which serves as a second class lever. A triangular linking member 92 is pivotally connected to the link 88, to another of the adjustable blocks 93 and another link 94. The opposite end of link 94 is connected to a triangular shaped link 96 at one corner thereof. The other two vertices of the triangular member 96 provide the attaching point for link 98 which supports the jogging rod 102 and the locking means 100 which during use retains the bar 98 along the side of triangular member 96. The motion imparted to the linkage by the eccentric cam 84 is transmitted by the linkage to the rod 102 which periodically moves toward the stack of sheets bumping the stack into alignment.

Referring now to FIG. 6, it can be seen that the shelf structure has been slightly altered, said shelf 106 including a pair of indentations 108 and 110. As described above there will be a motor mounted beneath the floor which will drive an eccentrically mounted can 112 which in turn drives the cam follower 114 connected to link 116, a second class lever imparting a reciprocal motion thereto. Link 116 is connected at its opposite end to an adjustable block 118 similar to that described above. Intermediate of the two ends of link 116 there is connected at point 120 an irregularly shaped linking member 122 having a pivotal connection to adjustable block 124 at one corner. At another corner of member 122 is a pivotal connection to a link 126 which extends rearwardly of the shelf to pivotally connect to yet another link of irregular shape 128 which has pivotally connected thereto arm 130. Arm 130 is locked to another portion of link 128 by the lock 132 similar to that described above. At yet another portion of irregular link 128 is a pivotal connection to a rod 134 which extends back toward the front of the shelf mechanism where it is connected to link 136. At the outermost ends of links 130 and 136 are jogging rods respectively 138 and 140 serving the same purpose as hereinabove described.

A similar linking structure is driven off another portion of irregularly shaped link 122. Link 142 is pivotally connected to link 122 and pivotally connected to another irregularly shaped link 144 having mounted thereupon link 146 interlocked at 148 and having a jogging rod 150 connected thereto. Another portion of link 144 is pivotally connected to a link 152 extending back toward the rear of the shelf structure and connected to link 154 pivoted about [link] *point* 156 and having mounted to its outer end a jogging rod 158.

Referring now specifically to FIG. 5, it can be seen that the shelf structure generally denoted as 2 will be mounted in an attractive cabinet 160 having appropriate controls 162 and including as a portion thereof a distributor generally denoted as 164 which will take the sheets of paper from a print out mechanism, said sheets being fed through openings 166. It is to be understood that the distributor mechanism may well be of the type described in U.S. Pat. No. 3,414,254 or any modification thereof wherein the distributor reciprocates vertically along the plurality of shelves distributing the sheets appropriately therein.

As can be seen, the present structure of a jogging mechanism [is] *in* association with a plurality of trays which form a sheet receiving [shelf] *bin* is such that the structure may be modified to have either a single jogger, a pair of joggers located on opposite sides of the shelf structure, or a system wherein there are four joggers on the [shelf] *bin*. Each of the [modification] *modifications* is readily adapted to be mounted within a similar cabinet structure 160 and the various structures while operating essentially identically offer advantages for sheets of various lengths and/or thickness. Applicant's jogger mechanism thereby is a universal structure which may be readily used to handle any one of a multiplicity of collating jobs when used in conjunction with a distributor such as that described in the Patent noted hereinabove.

The embodiments of the invention in which an exclusive property or privilege is claimed are defined as follows:

1. In combination with a sheet receiving [shelf] *bin comprising a column of shelves with each shelf* adapted to receive a plurality of sheets and form *a* uniform [stacks therefrom] *stack thereon*, a sheet stack jogging means comprising;

backup means mounted on the side of the [shelf] *bin* against which the stacks may be aligned, a jogging apparatus *including at least one* bar, *said bar being adjustable in distance from the backup means to accommodate sheets of different widths and being* mounted for movement to and from the [shelf] *bin* at a first position on the opposite side of the [shelf] *bin* from the backup means, said [jogging apparatus] *bar* movable [from] *between* the first position whereat it periodically jogs the sheets and a second position whereat it is substantially removed from the side of the [shelf] *bin* allowing easy access to the [stack] *stacks*, and linking means connecting said bar to an eccentrically mounted, motor driven wheel whereby the bar is periodically moved, when in its first position, to and from the [shelf] *bin* moving the sheets into contact with the backup means assuring [an] even [stack.] *stacks, said linking means including adjusting means operatively associated with said bar for varying the distance between the bar and said backup means for accommodating sheets of various widths.*

2. A jogging means as in claim 1 wherein the backup means is a second jogging apparatus whereby the stacks are jogged from both sides of the [shelf] *bin* and similarly can be removed from both sides of the [shelf] *bin*.

3. A jogging means as in claim 1 wherein the jogging apparatus is a single bar.

4. A jogging means as in claim 1, wherein the jogging apparatus is a plurality of bars operating simultaneously.

[5. A jogging means as in claim 1 and further including an adjusting device whereby the space between the jogging apparatus and the backup means may be varied to accommodate sheets of varying sizes.]

6. A jogging means as in claim 1 and further including a means for absorbing the movement of [the source of reciprocal motion] *said motor driven wheel* without damage to the structure.

7. A jogging means as in claim 1 wherein the linking means and [the source of motion] *said motor driven wheel* are mounted beneath [a] *the* bin comprising a plurality of stacked shelves and the jogging apparatus extends vertically upwardly substantially the entire vertical dimension of the [shelf] *bin*.

8. A jogging means as in claim 1 wherein ready access may be had to both sides of the [shelf] *bin* for removal of the stacks whereby the device is of universal utility.

9. A jogging means as in claim 4, wherein each of the bars is driven by [the source of reciprocal motion] *said motor driven wheel* and [are] *is* discrete.

10. In combination with a sheet receiving [shelf] *bin comprising a column of shelves with each shelf* adapted to receive a plurality of sheets and form uniform stacks thereon, a sheet stack jogger comprising; backup means mounted on one side of the [shelf] *bin* against which the stacks may be aligned, jogging means mounted adjacent the [shelf] *bin* opposite of and for movement toward and away from the backup means, an independent source of reciprocal motion mounted to the [shelf] *bin* and [linked to the jogging means,] *first linking means linking said source of reciprocal motion to the jogging means,* said *first* linking means comprising lever means mounted to receive motion from the source and having a fulcrum which is adjustable relative to the [shelf] *bin* to vary the distance between the jogging means and the backup means, rigid plate means pivotally mounted to [the] *said* lever *means* to receive motion therefrom and adjustably mounted to [said shelf structure] *the bin* for selective positioning relative to the fulcrum of said lever means, rigid linking means interconnecting the plate means and the jogging means whereby the plate movement is transmitted to the jogging means and the adjustment of the fulcrum of [the plate] *said lever means* relative to the [shelf] *bin* varies the distance between the jogging means and the backup means allowing use of the mechanism with paper of a variety of sizes.

11. A combination as in claim 10, wherein the jogging means comprises a single vertical bar on one side of the [shelf] *bin* and the [backing] *backup* means is a fixed surface.

12. A combination as in claim 10, and further including at least one moveable pivot to absorb the reciprocal motion in the event of a mechanical jam.

13. A combination as in claim 10, wherein the jogging means is adapted for movement to a position where it does not impede removal of the stacks of material.

14. A combination as in claim 10, wherein the backup means comprises a vertical bar which is reciprocal toward and away from the [shelf] *bin* providing a surface against which the [stack] *stacks* may be aligned and further, providing a tapping action against the [stack] *stacks* to assure proper alignment.

*15. In combination with a sheet receiving bin comprising a column of shelves with each shelf having means to receive a plurality of sheets and to form a uniform stack thereon, a sheet stack jogging means comprising:*

*backup means mounted on the side of the bin against which the sheets in the stacks may be aligned;*

*a jogging apparatus including at least one vertically extending jogging bar located adjacent said stacks and adapted to simultaneously contact the edges of the stacks, said bar being adjustable in distance from the backup means to accommodate sheets of different widths, mounting means mounting said bar for movement between a first jogging position on the opposite side of the bin from the backup means and a second position substantially removed from the sides of the stacks allowing easy access for side removal of all said stacks; and*

*linking means connecting said jogging bar to an eccentrically mounted, motor driven wheel, whereby the bar is periodically moved, when in its first position, to and from the bin in jogging motion, moving the sheets in said stacks into contact with the backup means, assuring even stacks, said linking means including adjusting means operatively associated with said bar for varying the distance between the bar and said backup means for accommodating sheets of various widths.*

*16. A jogging means as in claim 15 wherein, said mounting means for said jogging bar includes detachable connecting means for disconnecting said bar from the linking means to allow the bar to swing from said first position outwardly away from the stacks to said second position.*

*17. The sheet stack jogging means of claim 1, wherein the linking means further includes locking means engagable with the jogging apparatus when said bar is in its first position, and wherein the jogging apparatus can be disengaged from the locking means by moving said bar vertically.*

*18. The sheet stack jogger of claim 10, further comprising means linking the backup means to the first linking means such that adjustment of the fulcrum of said lever means relative to the bin causes the backup means and the jogging means to move in opposite directions.*

*19. The sheet stack jogger of claim 10, wherein the jogging means is rotatable between a first position adjacent the bin and a second position whereat it is substantially removed from the bin allowing easy access to the stacks.*

*20. The sheet stack jogger of claim 19, wherein the rigid linking means includes means for locking the jogging means in its first position.*

*21. The sheet stack jogger of claim 10, wherein the backup means is rotatable between a first position adjacent the bin and a second position whereat it is substantially removed from the bin allowing easy access to the stacks.*

* * * * *